US012800946B2

(12) United States Patent
Lin et al.

(10) Patent No.: US 12,800,946 B2
(45) Date of Patent: Nov. 17, 2026

(54) COMPOUND SPECTACLES

(71) Applicant: FGX International Inc., Smithfield, RI (US)

(72) Inventors: Xiao-Dan Lin, Wenzhou City (CN); Fang-Zhou Chen, Wenzhou City (CN); Fang-Qi Chen, Wenzhou City (CN); Fang-Yang Chen, Wenzhou City (CN); Eric Rhea, Cumberland, RI (US); Matthew Coon, New York, NY (US)

(73) Assignee: FGX International Inc, Smithfield, RI (US)

( * ) Notice: Subject to any disclaimer, the term of this patent is extended or adjusted under 35 U.S.C. 154(b) by 216 days.

(21) Appl. No.: 18/391,386

(22) Filed: Dec. 20, 2023

(65) Prior Publication Data

US 2024/0353690 A1 Oct. 24, 2024

(51) Int. Cl.

| | |
|---|---|
| ***G02C 9/04*** | (2006.01) |
| ***G02C 1/00*** | (2006.01) |
| ***G02C 1/06*** | (2006.01) |
| ***G02C 5/14*** | (2006.01) |
| *G02C 5/12* | (2006.01) |
| *G02C 5/22* | (2006.01) |

(52) U.S. Cl.

CPC ................. *G02C 1/10* (2013.01); *G02C 1/06* (2013.01); *G02C 5/146* (2013.01); *G02C 9/04* (2013.01); *G02C 5/12* (2013.01); *G02C 5/22* (2013.01); *G02C 2200/02* (2013.01); *G02C 2200/08* (2013.01)

(58) Field of Classification Search

None

See application file for complete search history.

(56) References Cited

U.S. PATENT DOCUMENTS

| | | | | |
|---|---|---|---|---|
| 3,060,803 A | 10/1962 | Mcculloch et al. | | |
| 3,838,914 A * | 10/1974 | Fernandez | G02C 1/04 | 351/41 |
| 4,269,487 A * | 5/1981 | Young | G02C 9/00 | 351/58 |
| 5,488,439 A * | 1/1996 | Weltmann | G02C 9/00 | 351/231 |
| 6,592,220 B1 | 7/2003 | Cheong | | |
| 6,971,745 B2 * | 12/2005 | Sheldon | G02C 11/02 | 351/86 |

(Continued)

*Primary Examiner* — Darryl J Collins

(74) *Attorney, Agent, or Firm* — MALLOY & MALLOY, PL

(57) ABSTRACT

A pair of spectacles includes a main frame, auxiliary frames removably mountable in the main frame, and a nose rest fixedly disposed on the main frame. The lenses are fixed in each auxiliary frame and to replace the lens, it is only necessary to remove the auxiliary frame and install another auxiliary frame with a new lens to achieve convenient lens replacement. The fixation, disassembly, and assembly of the auxiliary frame and the main frame are made convenient by connection via magnetic attraction at one end of the auxiliary frame and a positioning tab at another end thereof. For disassembly, the magnetically attracted end is first separated, followed by removing the auxiliary frame to separate the positioning tab from a positioning slot. For assembly, the positioning tab is first placed in the positioning slot, followed by fixing the magnetically attracted end.

15 Claims, 7 Drawing Sheets

(56) References Cited

U.S. PATENT DOCUMENTS

| | | | | |
|---|---|---|---|---|
| 7,510,279 | B2 * | 3/2009 | Van Atta | G02C 1/04 351/105 |
| 7,712,895 | B2 * | 5/2010 | Wang | G02C 1/04 351/106 |
| 9,766,477 | B1 * | 9/2017 | Chou | G02C 5/10 |
| 9,778,491 | B2 * | 10/2017 | Rinella | G02C 7/12 |
| 11,526,026 | B1 | 12/2022 | Santinelli | |
| 2005/0073643 | A1 | 4/2005 | Sheldon | |
| 2005/0128426 | A1 | 6/2005 | Shiue | |
| 2009/0015783 | A1 | 1/2009 | Lane et al. | |
| 2009/0122258 | A1 | 5/2009 | Fielding, Jr. | |
| 2009/0257019 | A1 | 10/2009 | DiChiara | |
| 2009/0296042 | A1 * | 12/2009 | Yeh | G02C 1/06 351/86 |
| 2010/0123870 | A1 * | 5/2010 | Li | G02C 1/04 351/57 |
| 2013/0070197 | A1 * | 3/2013 | Chang | G02C 1/06 351/154 |
| 2017/0184872 | A1 * | 6/2017 | Silver | G02C 1/10 |
| 2019/0146240 | A1 | 5/2019 | Chen | |
| 2019/0235269 | A1 | 8/2019 | Wilson et al. | |
| 2021/0109370 | A1 | 4/2021 | Jackson | |

* cited by examiner

COMPOUND SPECTACLES

BACKGROUND OF THE INVENTION

Field of the Invention

The present disclosure relates to the technical field of spectacles and, more particularly, to spectacles having lenses that are easily replaceable by the user.

Description of the Related Art

In traditional spectacles, the lenses are fixed firmly, and sometimes permanently, in the frames thereof. If the lenses must be detached for replacement, the excessively strong fixation of the lenses is inconvenient and not user friendly.

SUMMARY OF THE INVENTION

To address these and other needs in the art, one embodiment of the present invention provides the following: a pair of compound spectacles comprising a main frame, a pair of auxiliary frames mounted in the main frame and a nose rest fixedly disposed on the main frame, characterized in that: hollow retainer rings are fixedly provided in the main frame; a positioning slot is provided on one side of each of the lens rims of the main frame; a boss is fixedly provided behind each of the hollow retainer rings; the boss and the positioning slot are arranged diagonally; the front end surfaces of the auxiliary frames are in abutment with the rear end surfaces of the hollow retainer rings respectively; one side of each of the auxiliary frames is provided with a positioning tab that protrudes from the auxiliary frame and matches the positioning slot, while the other side of the auxiliary frame is provided with an indentation that matches the boss; the positioning tab is located in the positioning slot; the boss is located in the indentation; a magnet or ferromagnetic material is fixed in the boss; and the auxiliary frame also includes a magnet or magnetic material secure it to the main frame.

In another embodiment both sides of the main frame include end lugs and temple bars hingedly connected to the end lugs respectively; and the end lugs and the main frame are detachably connected by means of fastening assemblies.

In a further configuration each of the fastening assemblies includes a retainer bar fixedly disposed at the front end of the end lug and bent towards the nose rest. A post fixedly disposed behind the retainer bar protrudes therefrom. The front ends of the main frame are each provided with a retaining slot that is dimensioned and configured to receive the respective retainer bar; the bosses each include an alignment aperture disposed therein, which is dimensioned and configured to receive the respective post. The post may also include a threaded aperture and is fixedly connected to the boss by means of a fastener. The screw head is located at the rear end of the boss and may serve as the aforementioned ferromagnetic material.

In yet another embodiment, each of the temple bars includes a connecting block hingedly connected to the respective end lug. A cylindrical post is fixed at the rear end of the connecting block and a temple wire is fixed at the rear end of the cylindrical post. The temple wire has a radius smaller than that of the cylindrical post. An ear piece is sheathed on the temple wire and the cylindrical post.

Yet another embodiment includes a position-limiting slot matching the end lug formed on each side of the main frame close to the end lug.

In another embodiment, a male hinge member is fixed at the rear end of the end lug and a female hinge member is included on the rotating block facing toward the end lug. The male hinge member and the female hinge member are connected by means of a screw.

In another embodiment, an alignment ring is projects from the front end of the auxiliary frame, and, when installed in the main frame, an outer surface of the convex ring abuts the inner perimeter loop of the main frame.

The beneficial effects of the present utility model lie in the fact that that the lens is included in each auxiliary frame. To replace the lens, it is only necessary to remove the auxiliary frame and re-fix another auxiliary frame to the main frame. The fixation, disassembly, and assembly of the auxiliary frame and the main frame are made convenient by connection via magnetic attraction at one end of the auxiliary frame and the close fit between the positioning tab and the positioning slot at another end thereof. For disassembly, the magnetically attracted end is first separated, followed by a rotation or pivoting of the auxiliary frame to separate the positioning tab from the positioning slot. For assembly, the positioning tab is first placed in the positioning slot, followed by fixing the magnetically attracted end.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
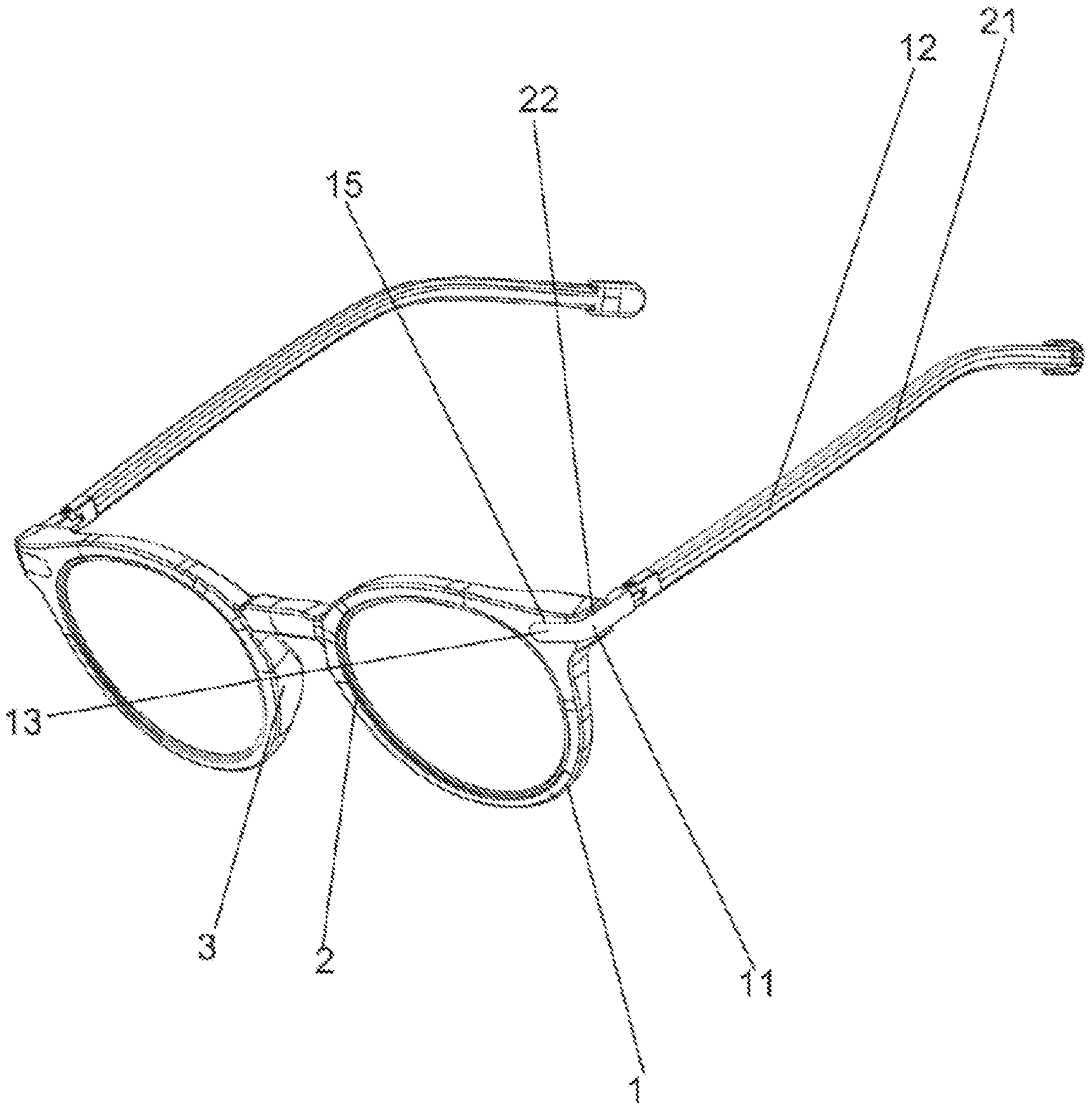
FIG. 1 is a structural schematic of one embodiment of the present invention.
Figure 2:
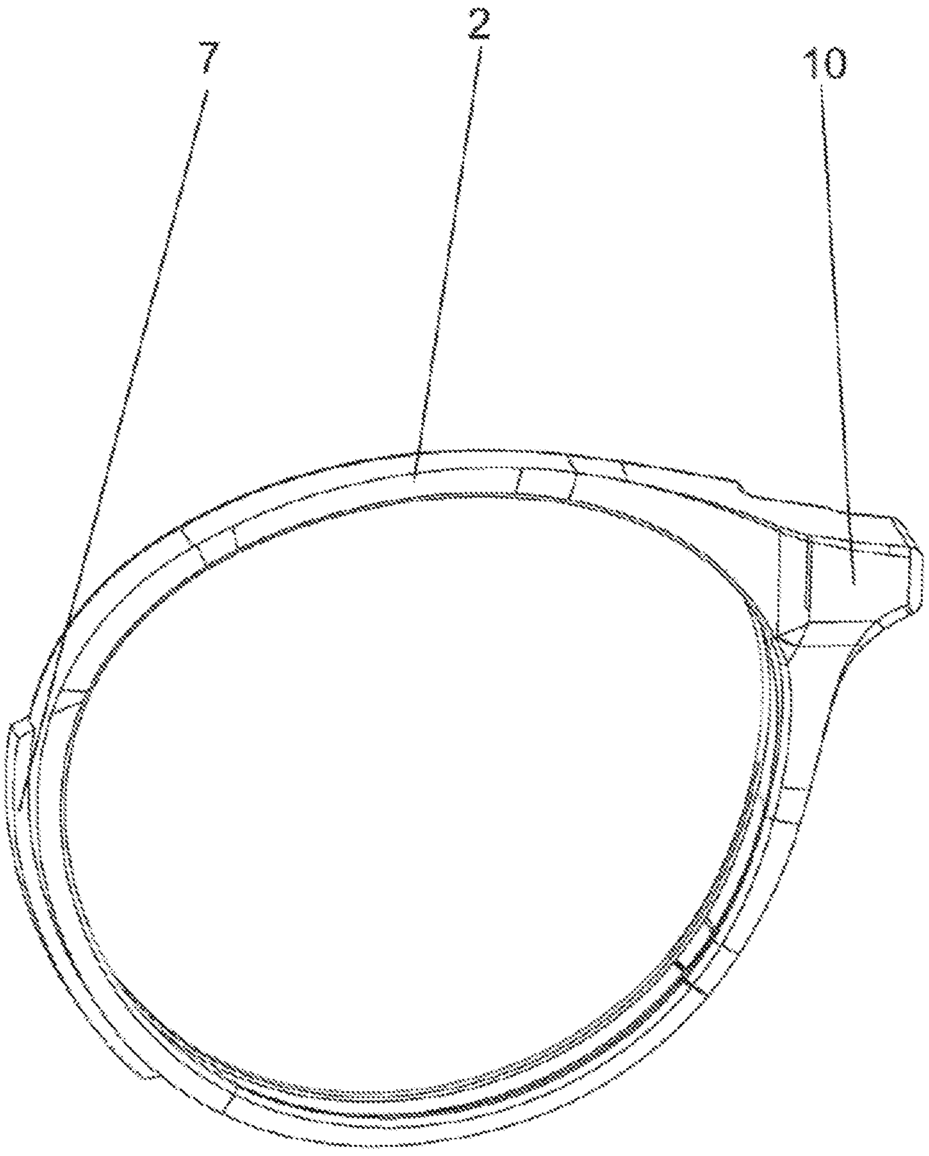
FIG. 2 is a structural schematic of an auxiliary frame of one embodiment of the present invention.
Figure 3:
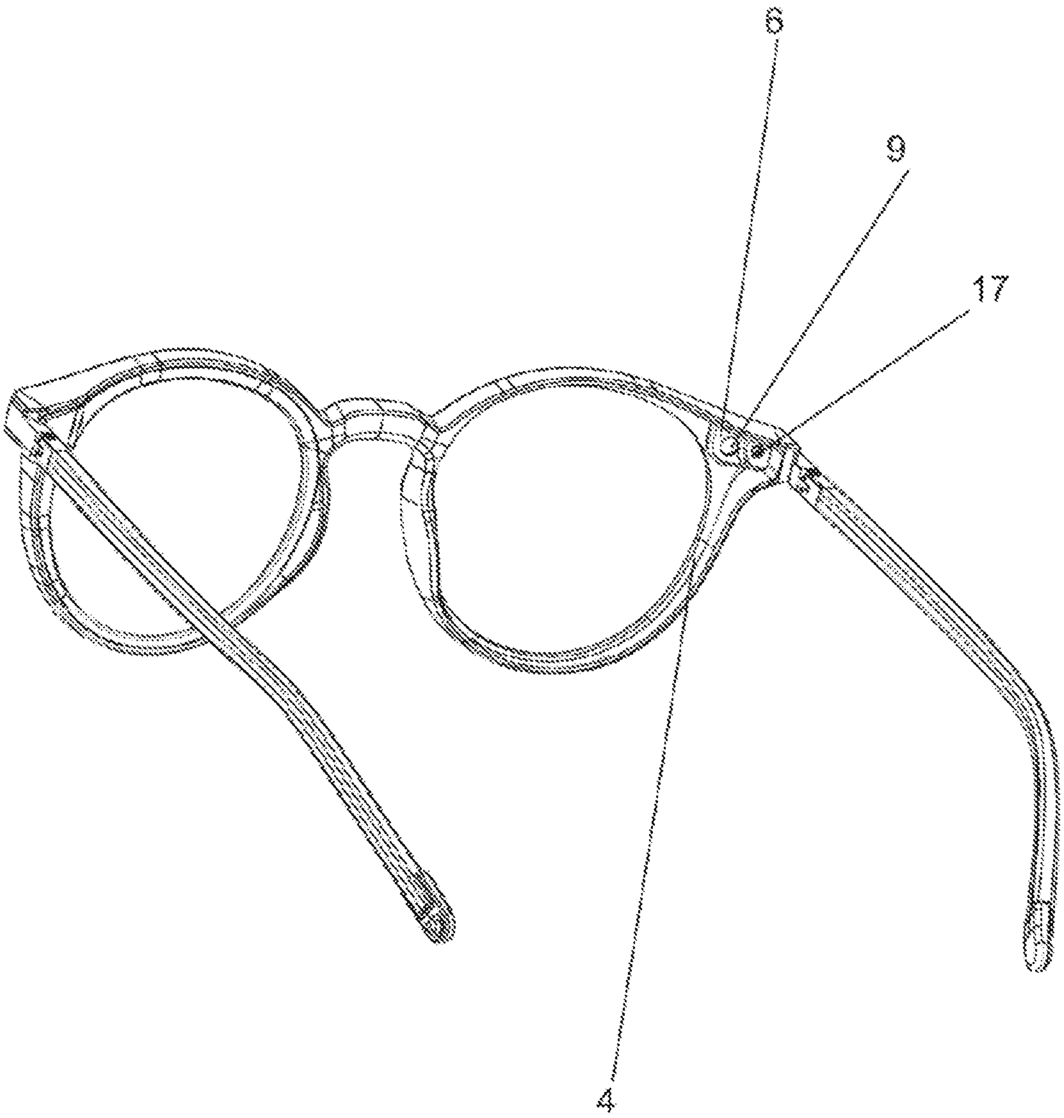
FIG. 3 is a structural schematic of one embodiment of the present invention with the auxiliary frames thereof removed.
Figure 4:
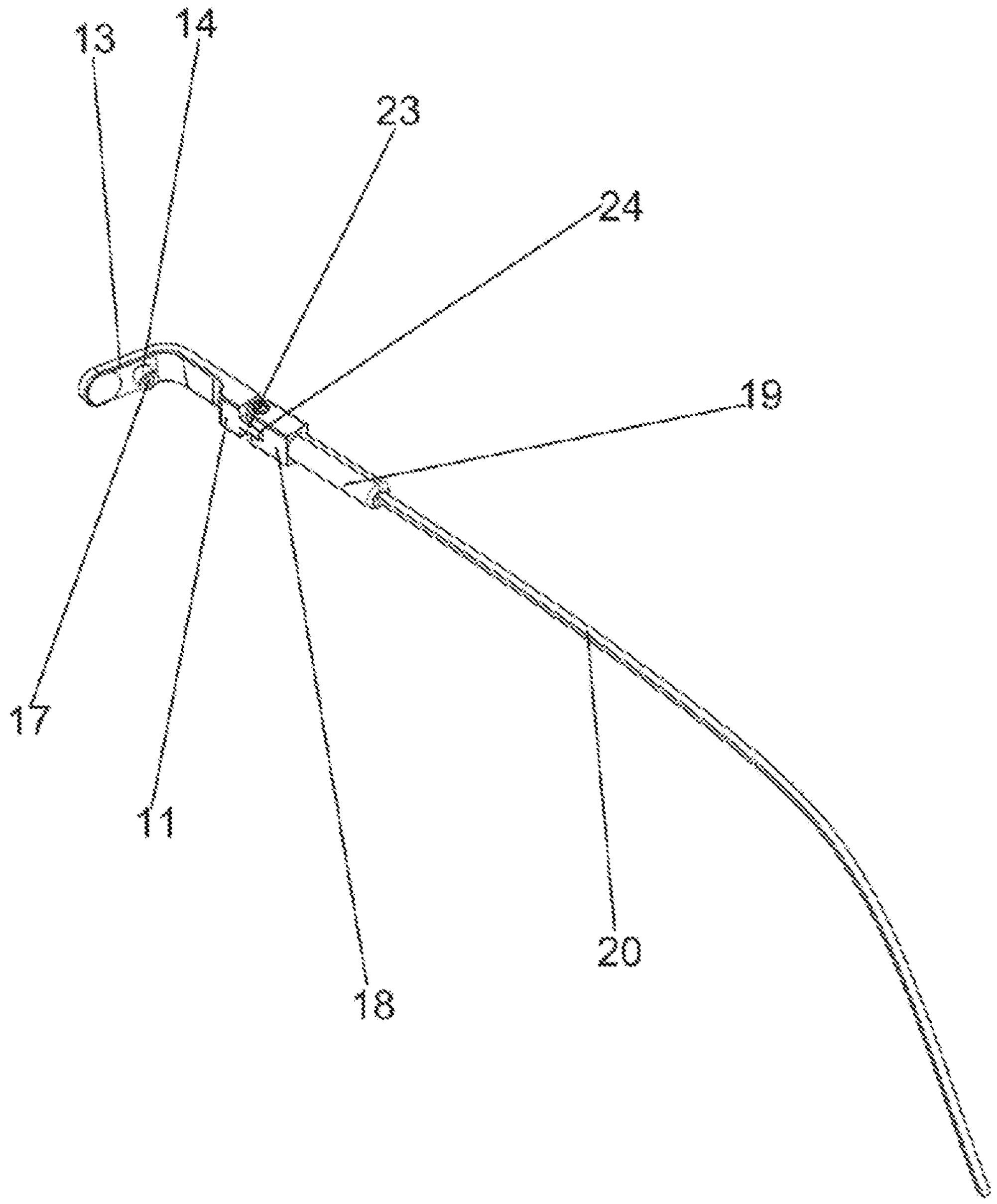
FIG. 4 is a structural schematic of a temple of one embodiment of the present invention.
Figure 5:
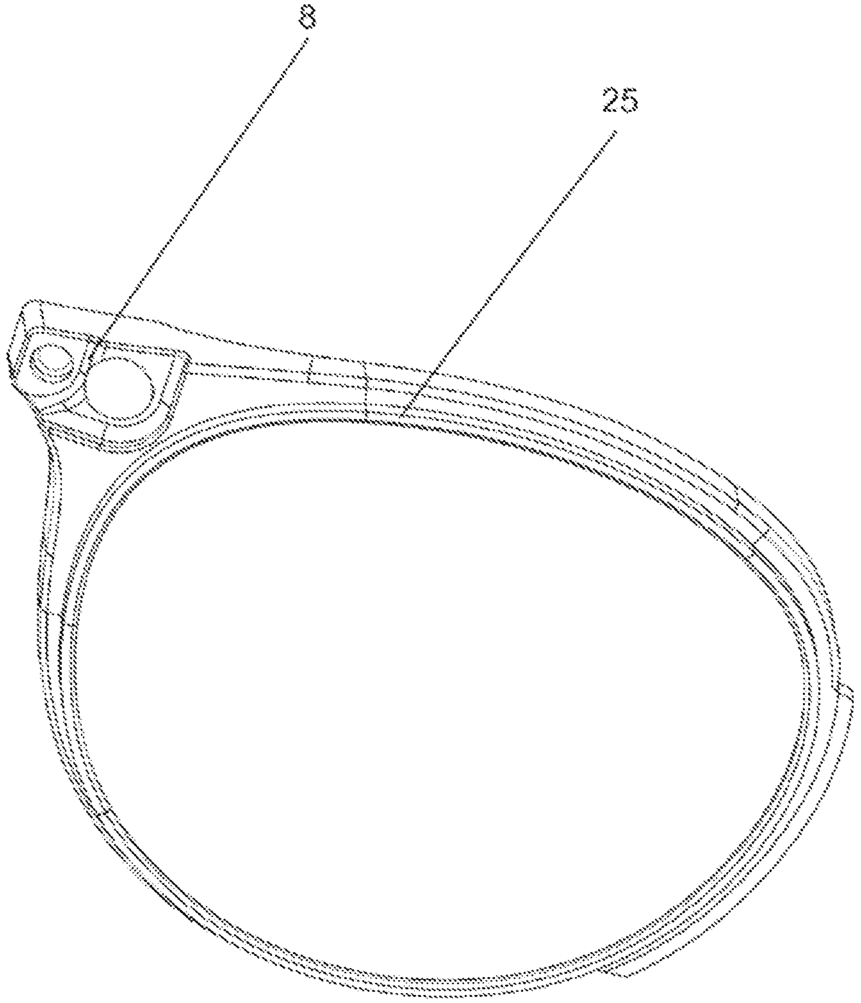
FIG. 5 is a structural schematic of an indentation disposed on an auxiliary frame one embodiment of the present invention.
Figure 6:
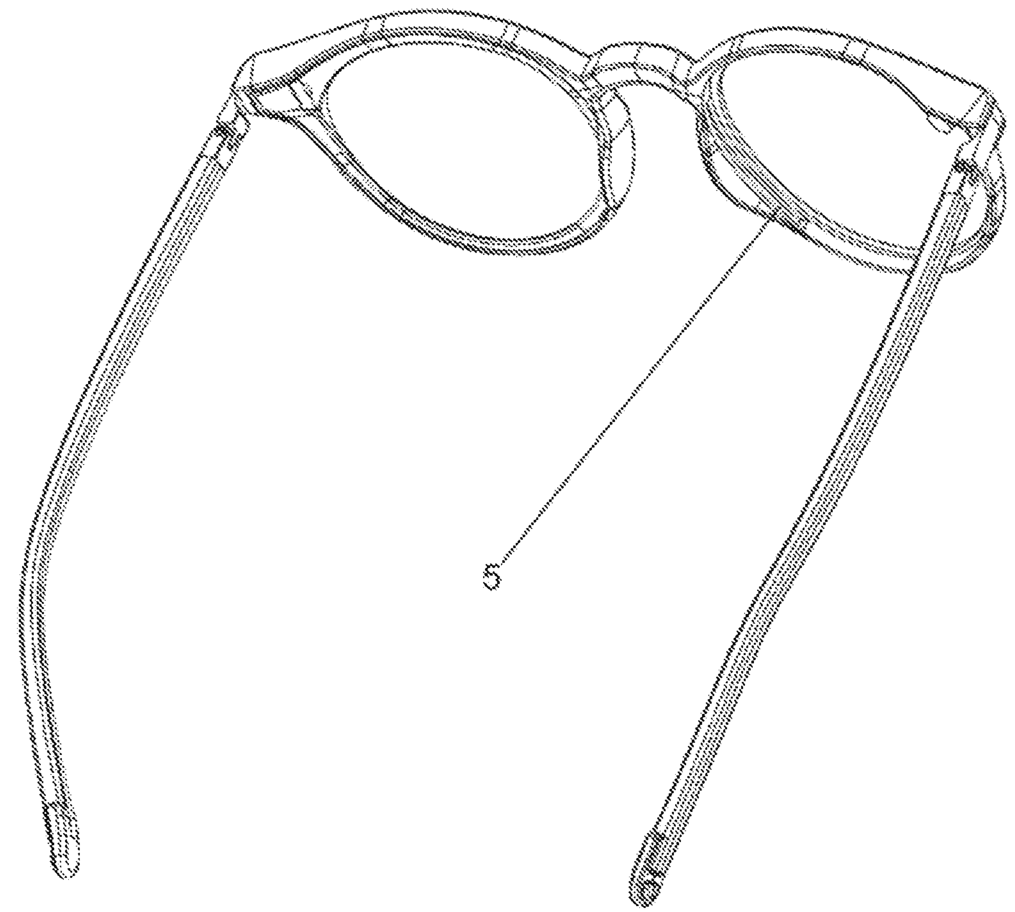
FIG. 6 is a structural schematic of a positioning slot disposed on the main frame of one embodiment of the present invention.
Figure 7:
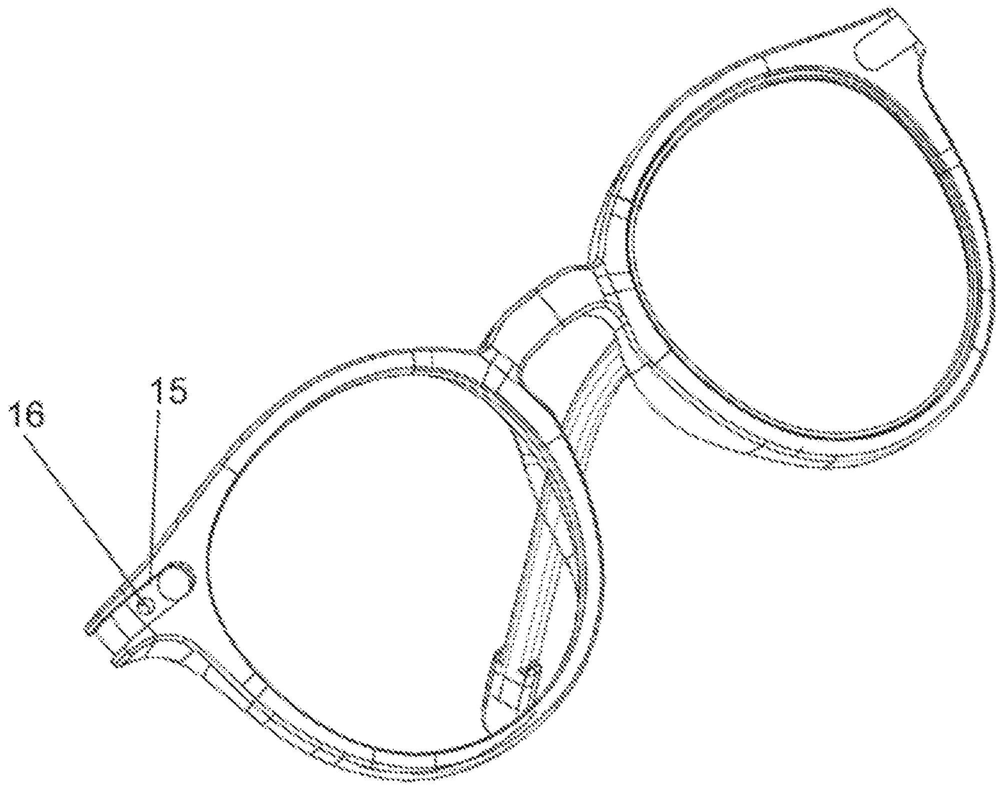
FIG. 7 is a structural schematic one embodiment of the present invention with the temples thereof removed.

With reference to FIGS. 1-7, the depicted embodiment includes eyewear comprising a main frame 1, a pair of auxiliary frames 2 mounted in the main frame 1 and a nose rest 3 fixedly disposed on the main frame 1. The main frame 1 also includes lens rims 4 to receive the auxiliary frames 2. The lens rims 4 may also include a positioning slot 5 on at least one side, which is dimensioned and configured to receive a positioning tab 7 that protrudes from the auxiliary frame 2. A boss 6 is located near the exterior profile of the lens rims 4 where an end lug 11 may be fixed to the main frame 1. When installed, the front surfaces of the auxiliary frames 2 will be in abutment with the rear surfaces of the lens rims 4 respectively. One side of each of the auxiliary frames 2 is provided with a positioning tab 7 that protrudes from the auxiliary frame 2 and corresponds dimensionally to be received by the positioning slot 5. The auxiliary frame 2 may also include an indentation 8 on the front surface that corresponds dimensionally to receive the boss 6.

In further embodiments, ferromagnetic material 9 is disposed within the boss 6 and the auxiliary frame 2 includes a magnet 10 to attract the ferromagnetic material 9. Of course, this arrangement may be swapped (with the magnet located in the boss and the ferromagnetic material in the auxiliary frame) or both components may simply include a magnet.

It will be appreciated now that the lenses are disposed within the auxiliary frames 2 and to replace the lens, it is only necessary to remove the existing auxiliary frame 2 and insert another auxiliary frame 2 with a new lens to the main frame 1. In this regard, changes to lenses are easily achieved by end users, without the need for tools or significant disassembly of the spectacles. The fixation, disassembly, and assembly of the auxiliary frame and the main frame are made convenient via magnetic attraction at one end of the auxiliary frame 2 and the mechanical fitment between the positioning tab 7 and the positioning slot 5 at another end thereof. For disassembly, the magnetically attracted end is first separated, followed by a slight pivot or rotation of the auxiliary frame 2 to withdraw the positioning tab 7 from the positioning slot 5. For assembly, the positioning tab 7 is first placed in the positioning slot 5, followed by fixing the magnetically attracted end.

In further embodiments, the temple bars 12 include end lugs 11, which are fastened to the main frame 1. Connecting the end lugs 11 with the main frame 12 by means of fastening assemblies is convenient for replacing the end lugs 11 and temples 12 in their entirety.

In yet further embodiments, each of the fastening assemblies includes a retainer bar 13 fixedly disposed at the front end of the end lug 11 and bent towards the nose rest 3. The retainer bar 13 may include a post 14 fixedly disposed and projecting from the retainer bar 13. Each side of the main frame 1 includes a retaining slot 15 that matches the respective retainer bar 13. In this configuration, the retainer bar 13 can be mounted flush with the front surface of the main frame 1. The bosses 6 include an alignment aperture 16 disposed therein and dimensioned to receive the respective post 14. The post 14 may also include a threaded aperture 17, with which the post 14 may be fastened to the boss 6 by means of a fastener. The fastener head of the screw is located at the rear end of the boss 6. When replacing the end lug 11 and/or temple 12, the respective auxiliary frame 2 is first separated from the main frame 1, followed by loosening of the fastener.

In yet another embodiment, each of the temples 12 includes a connecting block 18 hingedly connected to the respective end lug 11. A cylindrical post 19 is fixed at the rear end of the connecting block 18 and a temple wire 20 is fixed at the rear end of the cylindrical post 19. The temple wire 20 has a radius smaller than that of the cylindrical post 19. An ear piece 21 is sheathed on the temple wire 20 and the cylindrical post 19.

In yet another embodiment, a male hinge member 23 is fixed at the rear end of the end lug 11 and a female hinge member 24 is located on the end of the connecting block 18. A fastener May then be used as a pin to secure the male hinge member 23 and female hinge member 24 in hinging relationship to one another.

In yet another embodiment, the auxiliary frame 2 includes an alignment ring 25 protruding from the front end of the auxiliary frame 2 and encircling the lens. When installed on the main frame 1, the alignment ring 25 abuts the inner perimeter loop of the main frame 1. The alignment ring 25 facilitates the connection and proper alignment between the auxiliary frame 2 and the main frame 1.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. Eyewear comprising: a main frame, a pair of auxiliary frames mounted in the main frame and a nose rest fixedly disposed on the main frame, characterized in that: hollow retainer rings are fixedly provided in the main frame; a curved positioning slot is provided on one side of each of the lens rims of the main frame; a raised block is fixedly provided behind each of the hollow retainer rings; the raised block and the curved positioning slot are arranged diagonally; the front end surfaces of the auxiliary frames are in abutment with the rear end surfaces of the hollow retainer rings respectively; one side of each of the auxiliary frames is provided with a curved positioning plate that protrudes from the auxiliary frame and matches the curved positioning slot, while the other side of the auxiliary frame is provided with an indentation that matches the raised block; the curved positioning plate is located in the curved positioning slot; the raised block is located in the indentation; a lodestone is fixed in the raised block; and the auxiliary frame is provided with a magnet to attract the lodestone.

2. Eyewear as defined in claim 1, characterized in that: both sides of the main frame are provided with end lugs and temples rotatably connected to the end lugs respectively; and the end lugs and the main frame are detachably connected by means of fastening assemblies.

3. Eyewear as defined in claim 2, characterized in that: each of the fastening assemblies includes a retainer bar fixedly disposed at the front end of the end lug and bent towards the nose rest and a directional post fixedly disposed behind the retainer bar; the front ends of the main frame are each provided with a retaining slot that matches the respective retainer bar; the raised blocks are each provided with a directional slot disposed therein and matching the respective directional post; the directional slot and the retaining slot are interpenetrated; the directional post is provided with a threaded hole; the directional post is fixedly connected to the raised block by means of a screw spirally disposed in the threaded hole; and the screw head of the screw is located at the rear end of the raised block.

4. Eyewear as defined in claim 3, characterized in that: each of the temples includes a connecting block rotatably connected to the respective end lug; a cylindrical post is fixed at the rear end of the connecting block; a temple wire is fixed at the rear end of the cylindrical post; the temple wire has a radius smaller than that of the cylindrical post; and an ear piece is sheathed on the temple wire and the cylindrical post.

5. Eyewear as defined in claim 4, characterized in that: a position-limiting slot matching the end lug is provided on each side of the main frame close to the end lug.

6. Eyewear as defined in claim 5, characterized in that: a rotating block is fixed at the rear end of the end lug; a rotation slot matching the rotating block is provided at one end of the rotating block facing toward the end lug; the rotation slot is located in the rotating block; the rotating block and the connecting block are connected by means of a screw.

7. Eyewear as defined in claim 6, characterized in that: a convex ring is fixed at the front end of the auxiliary frame, and an outer surface of the convex ring is in abutment with the inner perimeter loop of the main frame.

8. An eyewear system comprising:

at least a main frame and a plurality of auxiliary frames;
said main frame including at least a plurality of lens rims;
and said plurality of auxiliary frames are each dimensioned and configured to be releasably mounted within corresponding ones of said plurality of lens rims;
wherein said main frame further comprises a positioning slot in each lens rim; each of said auxiliary frames further comprising a positioning tab protruding therefrom;
wherein said main frame includes at least one of a magnet and ferromagnetic material disposed on a rear surface of said main frame;
each of said plurality of auxiliary frames further comprising at least one of a magnet and ferromagnetic material disposed on a front surface of said auxiliary frame.

9. The eyewear system as recited in claim 8 wherein said main frame includes at least one of a magnet and ferromagnetic material disposed on a rear surface of said main frame; each of said plurality of auxiliary frames further comprising at least one of a magnet and ferromagnetic material disposed on a front surface of said auxiliary frame.

10. The eyewear system as recited in claim 9 wherein said main frame includes at least one boss and each of said plurality of auxiliary frames includes an indentation on said front surface of said auxiliary frame which is dimensioned and configured to receive said boss.

11. The eyewear system as recited in claim 10 wherein said boss includes a magnet.

12. The eyewear system as recited in claim 10 wherein said boss includes a ferromagnetic material.

13. The eyewear system as recited in claim 8 wherein each of said plurality of auxiliary frames further comprises an alignment ring protruding from a front face of said auxiliary frame.

14. The eyewear system as recited in claim 13 wherein said alignment ring encircles a lens.

15. The eyewear system as recited in claim 13 wherein said alignment ring abuts said main frame when one of said plurality of auxiliary frames is installed in said main frame.

* * * * *